US011295011B2

(12) United States Patent
Sun et al.

(10) Patent No.: US 11,295,011 B2
(45) Date of Patent: Apr. 5, 2022

(54) EVENT-TRIGGERED BEHAVIOR ANALYSIS (71) Applicant: VMware, Inc., Palo Alto, CA (US)

(72) Inventors: Ruimin Sun, Gainesville, FL (US); Vijay Ganti, Fremont, CA (US); Zhen Mo, Sunnyvale, CA (US); Bin Zan, Santa Clara, CA (US); Vamsi Akkineni, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 600 days.

(21) Appl. No.: 16/242,396

(22) Filed: Jan. 8, 2019

(65) Prior Publication Data

US 2020/0218800 A1 Jul. 9, 2020

(51) Int. Cl.
*G06F 21/55* (2013.01)
*G06N 20/00* (2019.01)
*G06F 21/56* (2013.01)
*G06K 9/62* (2022.01)
*G06F 21/53* (2013.01)

(52) U.S. Cl.
CPC ............ *G06F 21/552* (2013.01); *G06F 21/53* (2013.01); *G06F 21/554* (2013.01); *G06F 21/566* (2013.01); *G06K 9/6269* (2013.01); *G06N 20/00* (2019.01)

(58) Field of Classification Search
CPC ...... G06F 21/552; G06F 21/53; G06F 21/554; G06F 21/566; G06N 20/00; G06K 9/6269
See application file for complete search history.

(56) References Cited

U.S. PATENT DOCUMENTS

| 9,654,485 | B1 * | 5/2017 | Neumann | H04L 63/1441 |
| 2013/0145463 | A1 * | 6/2013 | Ghosh | G06F 21/56 726/22 |
| 2013/0305357 | A1 * | 11/2013 | Ayyagari | H04B 7/18593 726/22 |
| 2016/0232353 | A1 * | 8/2016 | Gupta | G06F 21/552 |
| 2016/0371471 | A1 * | 12/2016 | Patton | G06F 21/6218 |
| 2017/0039371 | A1 * | 2/2017 | Lukacs | G06F 21/564 |
| 2017/0083703 | A1 * | 3/2017 | Abbasi | G06F 21/561 |
| 2018/0032938 | A1 * | 2/2018 | Scriffignano | G06K 9/6277 |
| 2018/0198812 | A1 * | 7/2018 | Christodorescu | H04L 63/1425 |
| 2018/0234434 | A1 * | 8/2018 | Viljoen | G06F 21/554 |
| 2018/0248904 | A1 * | 8/2018 | Villella | H04L 63/1425 |
| 2019/0197239 | A1 * | 6/2019 | Govardhan | H04L 63/1416 |
| 2020/0065728 | A1 * | 2/2020 | Wilson | G06N 20/00 |
| 2020/0186544 | A1 * | 6/2020 | Dichiu | G06N 20/00 |
| 2020/0193239 | A1 * | 6/2020 | Wilson | G06K 9/6267 |

* cited by examiner

*Primary Examiner* — Hee K Song (74) *Attorney, Agent, or Firm* — Patterson + Sheridan, LLP (57) ABSTRACT Certain aspects herein provide a system and method for performing behavior analysis for a computing device by a computing system. In certain aspects, a method includes detecting an event occurring at the computing device at a first time, determining, based on the detecting, an event category of the event, and collecting first one or more behaviors associated with the determined event category occurring on the computing device based. The method also includes comparing the first one or more behaviors with a dataset indicating one or more expected behaviors of the computing device associated with the event. Upon determining that at least one of the first one or more behaviors corresponds to an unexpected behavior based on the comparing, the method further includes taking one or more remedial actions.

20 Claims, 3 Drawing Sheets

EVENT-TRIGGERED BEHAVIOR ANALYSIS

BACKGROUND

Behavior analysis is widely used in computer systems and data centers. A behavioral analysis refers to analyzing the behaviors of a computing device or system to identify unexpected or undesired behavior. A behavior refers to one or more states that a computing device may be in and/or one or more operations performed by the computing device. Behavioral analysis can be used for diagnosing system and software resilience, evaluating resource usages, and enhancing system security. An example of a data center where behavior analysis may be used comprises a plurality of hosts in communication over a physical network infrastructure, each host having one or more virtual computing instances (VCIs) such as virtual machines (VMs) or containers that are connected to logical overlay networks that may span multiple hosts and are decoupled from the underlying physical network infrastructure.

Current behavioral analysis solutions and techniques suffer from a variety of deficiencies. For example, when monitoring a computing device, some current solutions are configured to examine all behaviors of the computing device. Examining and collecting information associated with all behaviors of a computing device, however, results in incurring a large overhead, including an inefficient use of compute and storage resources as well as delays in detecting unexpected behaviors in real time because a larger amount of information may need to be considered for diagnosis.

Some other behavioral analysis solutions may be configured to only collect information associated with a certain set of behaviors relating to the computing device regardless of the type of events or operations that are occurring at the computing device. As an example, a behavioral analysis solution for detecting security threats may be configured to only examine network-related behaviors of a computing device, which may include examining IP addresses that the computing device is communicating with, the port number that the computing device may be listening on, etc. However, a certain malicious process may instead be compromising the computing device's file system, in which case a behavioral analysis solution that only examines the computing device's network behavior may not be able to detect the malicious behavior.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
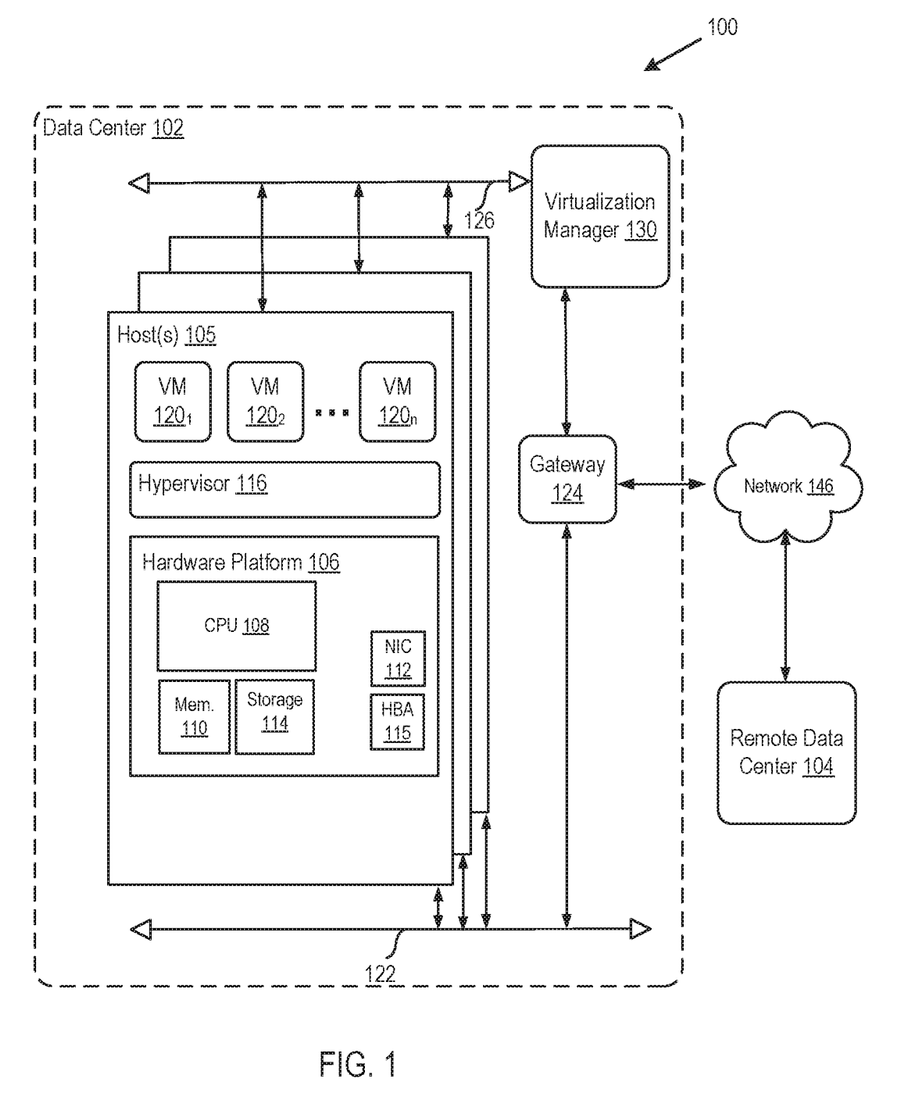
FIG. 1 is a block diagram illustrating a computing system, in accordance with certain aspects of the disclosure.

FIG. 1 depicts a block diagram of a computer system 100 where certain aspects described herein may be implemented, in accordance with the disclosure. In certain aspects, data center 102 is an on-premise data center that is controlled and administrated by a particular enterprise or business organization, while remote data center 104 is a cloud computing system that is operated by a cloud computing service provider (e.g., Amazon Web Services (AWS), Google Cloud, etc.) and exposed as a service available to account holders, such as the particular enterprise in addition to other enterprises. As such, on-premise datacenter 102 may sometimes be referred to as a "private" cloud, and remote data center 104 may be referred to as a "public" cloud. In another example, remote data center 104 may also be a "private" cloud.

Data center 102 includes host(s) 105, a gateway 124, a virtualization manager 130, a management network 126, and a data network 122. Each of hosts 105 is typically on a server grade hardware platform 106, such as an x86 architecture platform. Hosts 105 may be geographically co-located servers on the same rack or on different racks in any location in data center 102.

Host 105 is configured with a virtualization layer, referred to herein as hypervisor 116, that abstracts processor, memory, storage, and networking resources of hardware platform 106 into multiple virtual machines $120_1$ to $120_n$ (collectively referred to as VMs 120 and individually referred to as VM 120). VMs on the same host 105 may use any suitable overlaying guest operating system(s) and run concurrently with the other VMs. VMs 120 may communicate through a virtual switch that is implemented as part of hypervisor 116.

Hypervisor 116 architecture may vary. In some aspects, hypervisor 116 can be installed as system level software directly on the hosts 105 (often referred to as a "bare metal" installation) and be conceptually interposed between the physical hardware and the guest operating systems executing in the VMs. Alternatively, hypervisor 116 may conceptually run "on top of" a conventional host operating system in the server. In some implementations, hypervisor 116 may comprise system level software as well as a privileged VM machine (not shown) that has access to the physical hardware resources of the host 105. In such implementations, a virtual switch, virtual tunnel endpoint (VTEP), etc., along with hardware drivers, may reside in the privileged VM. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 includes components of a computing device such as one or more processors (CPUs) 108, a system memory 110, a network interface 112, a storage system 114, a host bus adapter (HBA) 115, and other I/O devices such as, for example, a mouse and keyboard (not shown). CPU 108 is configured to execute instructions such as executable instructions that perform one or more operations described herein. The executable instructions may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks.

Gateway 124 (e.g., executing as a virtual appliance) provides VMs 120 and other components in data center 102 with connectivity to network 146 used to communicate with other devices, for example, at remote data center 104. Gateway 124 manages external public IP addresses for VMs 120 and routes traffic incoming to and outgoing from data center 102 and provides networking services, such as firewalls, network address translation (NAT), dynamic host configuration protocol (DHCP), and load balancing. Gateway 124 uses data network 122 to transmit data network packets to hosts 105. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory ("memory") 110 is hardware for allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples host 105 to one or more external storages (not shown), such as a storage area network (SAN) or a distributed virtual SAN. Other external storages that may be used include a network-attached storage (NAS) and other network data storage systems, which may be accessible via NIC 112. Storage system 114 represents persistent storage device(s). Storage 114 may be one or more hard disks, flash memory modules, solid state disks, and/or optical disks. Data on storage disks of storage 114 may be organized into blocks, and each block on storage system 114 may be addressable. Although storage 114 is shown as being local to host 105, storage 114 may be external to host 105, such as by connection via HBA 115.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc. Though certain aspects are described herein with respect to VMs, such aspects are also applicable to other types of virtual computing instances, such as containers.

In certain aspects, remote data center 104 provides the enterprise associated with data center 102 with a cloud computing environment that is configured as a dedicated cloud service for a single tenant comprised of dedicated hardware resources (e.g., physically isolated from hardware resources used by other users). In certain other aspects, the cloud computing environment is configured as part of a multi-tenant cloud service with logically isolated virtualized computing resources on a shared physical infrastructure. The cloud computing environment includes hardware resources, storage resources, and networking resources (not shown). Hardware resources may include a number of physical servers/hosts, similar to hosts 105. Storage resources may include a storage area network (SAN), distributed virtual SAN, or network-attached storage (NAS) and other network data storage systems. Networking resources may include switches, routers, and other network devices for connecting hosts together, hosts to storage resources, and hosts with network entities at data center 102.

The cloud computing environment may provide compute and storage resources to data center 102. Processes and applications can be executed on the hardware resources of the cloud computing environment. For example, processes and applications can be directly executed on hosts of cloud computing environment, or in VMs or other virtual entities running on such hosts.

In certain aspects, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In certain aspects, the hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

As described above, current behavior analysis solutions that may be used in a data center, such as data center 102, suffer from a number of deficiencies. Namely, certain current solutions are configured to monitor and examine all behaviors of a VM 120 while other current solutions may be configured to only examine a certain set of behaviors in all scenarios, regardless of the events and operations occurring at VM 120.

Accordingly, certain aspects described herein provide an event-based or event-triggered behavior analysis mechanism. More specifically, the event-triggered behavior analysis mechanism described herein performs data collection and analysis to identify unexpected behaviors associated with a computing device, such as a VM 120, based on events, and the characteristics thereof, that occur during the operations of VM 120. The event-triggered behavior analysis mechanism is implemented by a number of components, including an event monitor, a behavior collector, and an automated verification module (AVM).

Event-triggered behavior analysis mechanism utilizes the event monitor and behavior collector components to observe a VM 120 during an observation period in order to generate data associated with expected behaviors of the VM 120 relating to a number of events. Note that an observation period refers to a defined period where VMs 120, including the applications and processes operating thereon, are expected to behave expectedly (e.g., without issues or failures, non-maliciously, etc.). For example, the observation period may be a two-week period during which administrators expect VMs 120 to behave in a manner that is expected.

The data generated during the observation period is then compared by the AVM with data that is generated by the event monitor and behavior collector components during a monitoring period. Based on the comparison and how different the two datasets are, the AVM is configured to identify unexpected behaviors of the VM 120. Note that, the monitoring period, refers to a period after the observation period where the VM 120 may behave unexpectedly (e.g., with issues or failures, maliciously, etc.). For example, the monitoring period refers to a period when VMs 120 may be exposed to issues such as system scheduling issues, faulty application code releases, malicious attacks, etc. In certain aspects, the observation period may be similar to a test period while the monitoring period may refer to a period when VM 120₁ is deployed for use.

Figure 2:
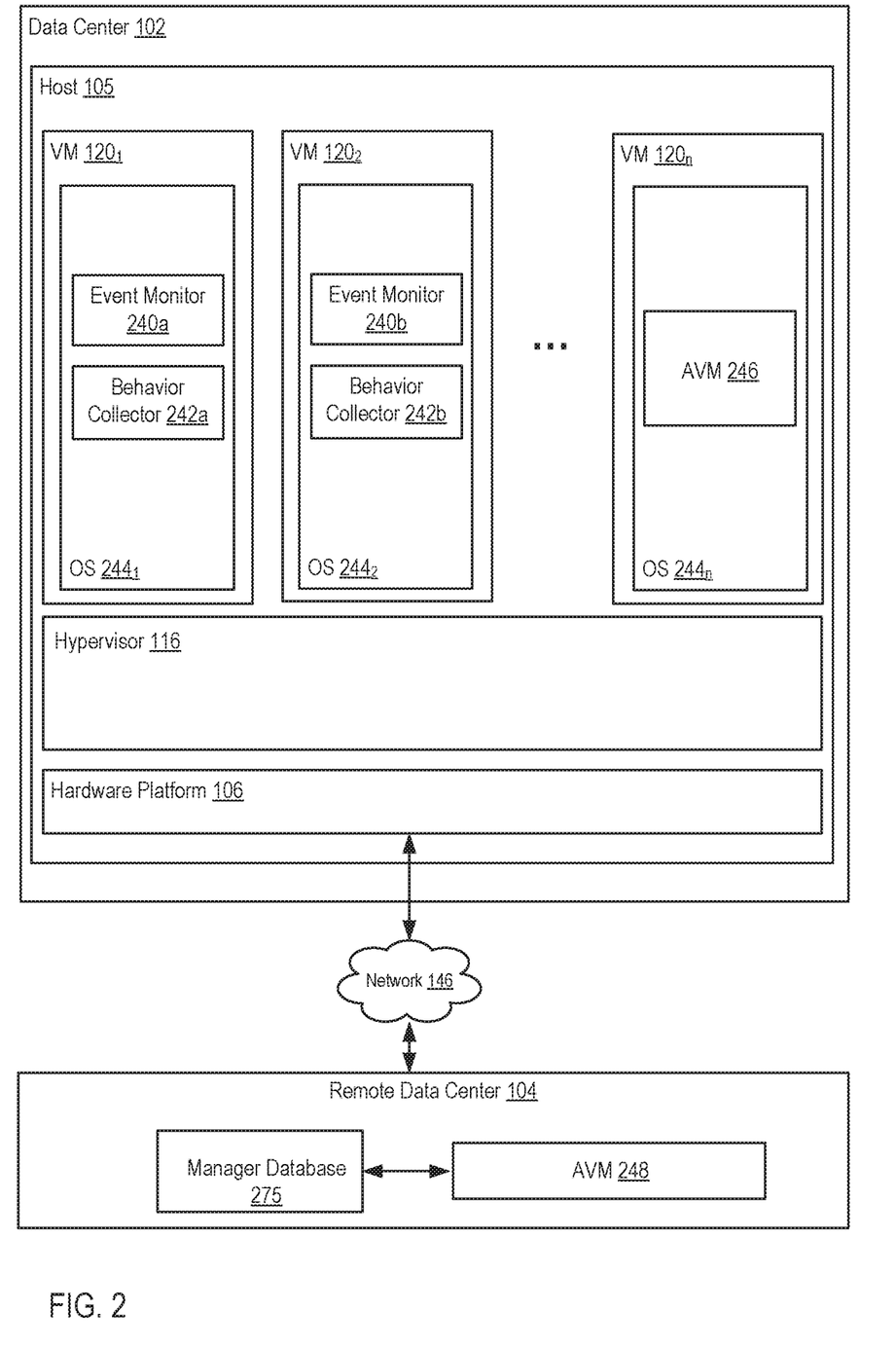
FIG. 2 is a block diagram illustrating a host in the computing system of FIG. 1, in accordance with certain aspects on the disclosure.

FIG. 2 illustrates an example implementation of the event-triggered behavior analysis mechanism within data center 102 and remote data center 104. FIG. 2 illustrates host 105 within data center 102 that executes VMs 120₁-120ₙ, each comprising a guest operating system (OS) 244. Event monitors 240 and behavior collectors 242 are processes executing in the user space of OSs 244.

An event monitor 240 is configured to monitor the operations of a corresponding VM 120 and record or collect events that occur during the operations of the VM 120. An event refers to one or more occurrences associated with the operations of a VM 120. For example, an event may be a process-related event that occurs at VM 120. An example of a process-related event may include a process attempting to load a library while the library version is not supported by VM 120. Another example of a process-related event may include a process attempting to access a part of the memory associated with VM 120 while the process does not have permission to do so, or a process that forks too many threads, etc. Note that an event is not limited to only one occurrence. For example, a process-related event may include a process attempting to load a library while the library version is not supported as well as the same process forking too many threads.

Other event types or categories may include network-related events, memory related events, signal-related events, file-related events, etc. Examples of a network-related event detected by an event monitor 240 may include data packets being received at VM 120 from a certain IP address, a specific port number that a process or application running on VM 120 may bind to or be listening on, or an incoming packet containing sensitive information. Examples of a memory-related event may include a process or application being allocated a very large size of memory, a memory mapping issue, or if memory information is incorrectly set. An example of a signal-related event may include a process or application waiting for an object for too long and timing out. Also, examples of a file-related event may include an application or process opening or creating a certain file, querying attributes of a file, or locking a file.

After event monitor 240a records an event associated with VM 120's operations during a certain period, such as the observation or monitoring period, it is configured to perform a preliminary analysis to determine the type of the detected event, based on the characteristics of the event. For example, event monitor 240a may record an event that relates to a process that has forked too many threads. In such an example, event monitor 240 may be configured to identify the event as a process-related event.

Subsequently, the recorded event and its types may be shared with a corresponding behavior collector 242, which is configured to collect additional and/or more detailed event-specific behaviors about the recorded event based on the type of the event. For example, if a certain event is categorized as a process-related event by event monitor 240, behavior collector 242 collects process-related behaviors for the event. Examples of process-related behaviors include the process's name, the process's ID, the parent process's ID, the execution path of the process, the command line parameters of each process, the list of Dynamic Link Libraries (DLLs) loaded by the process, etc. Note that, in certain cases, a recorded event may involve more than one process, in which case behavior collector 242 may collect behaviors associated with all the involved processes.

In another example, if a certain event is categorized as a network-related event by event monitor 240, behavior collector 242 collects network-related behaviors for the event. Examples of network-related behaviors include information associated with incoming and outgoing connections, such as the IP addresses that VM 120 sends and receives information to and from, the port number VM 120 listens on, the status of the connections, and the network protocols associated with the connections, etc. Examples of memory-related behaviors may include the starting address and the size of memory being allocated for a process and the frequency of the memory being accessed, allocated and deallocated, etc. Examples of usage-related behaviors may include the amount of resources being used for a process, such as compute (CPU) resources, storage recourses, and paged and non-paged memory resources. An example of a security-related behavior includes a process's security token that represents a list of privileges indicating, for example, whether the process is permitted to access a specific object or perform a specific operation. Other types of behaviors may also include machine or VM-related behaviors which may include the VM 120's hostname, MAC address, and the universally unique identifier (UUID) that uniquely represents VM 121.

Note that, in certain aspect, an event may have more than one type or indicate more than one category. For example, a recorded event may be both a process-related event and a network-related event, in which case, behavior collector 242 may collect both process-related behaviors and network-related behaviors about the recorded event. A more specific example includes an event that is triggered when a process performs a certain operation that the process is not permitted to perform, locks a certain file, and starts transmitting packets to a certain IP address. In such an example, the event may be categorized as a security-related event, a file-related event, and a network related event all at the same time. As such, behavior collector 242 collects security-related behaviors, file-related behaviors, and network-related behaviors about the recorded event. Also note that an event may include information associated with more than one process. For example, an event may relate to a first process that locks a certain file and a second process that starts transmitting packets to a certain IP address. In such an example, the event may be categorized as both a file-related event and a network-related event.

Although in the example of FIG. 2, a behavior collector 242 executes in a guest OS 244 of each VM 120, in certain other examples, a single behavior collector may operate as part of hypervisor 116 to serve all VMs 120. In that example, the behavior collector may be prepackaged as part of a hypervisor 116, or may be subsequently added to a hypervisor 116 as additional code/software.

In addition to event monitors 240 and behavior collectors 242, the event-triggered behavior analysis mechanism also includes an AVM. The AVM is responsible for performing behavioral analyses to detect unexpected behaviors associated with the operations of a VM 120 based on information (e.g., event-based behaviors) received from a corresponding behavior collector 242. For example, the AVM may be configured to compare the information generated by a behavior collector 242 during the observation period with information generated by the behavior collector 242 during the monitoring period to identify unexpected behavior of a corresponding VM 120. One of many techniques may be used for such a comparison. For example, a technique described herein includes the use of an unsupervised machine learning method or technique that is configured to first train a dataset using information associated with expected behaviors of a VM 120 that is generated during the observation period. The method then uses the trained dataset during a monitoring period to determine how different the behaviors of the VM 120 are from its expected behaviors.

In certain aspects, the AVM may also perform data pre-processing and encoding/decoding on data sets received from behavior collectors 242 during the observation and monitoring periods. Data pre-processing is performed because raw data that is collected by behavior collectors 242 may be incomplete, inconsistent, missing certain values in specific fields, and may even contain errors. As such, data pre-processing is performed to transform raw data into a machine understandable format. Examples of data pre-processing methods that may be utilized herein include label encoding, or one-hot encoding, etc. One of ordinary skill in the art appreciates the use and operational details of such encoding techniques.

After performing data-preprocessing, in certain aspects, the AVM is configured to train a dataset, for example using an unsupervised machine learning method involving the use of autoencoding and one-class support vector machine (SVM) techniques. Unsupervised machine learning is a type of machine learning algorithm used to draw inferences from datasets consisting of input data without labeled responses. Autoencoding refers to the process of encoding and decoding data using an auto-encoder. An autoencoder is an artificial neural network that learns to compress input data into a short code (encoding), and then uncompress that code into something that closely matches the original input data (decoding). The encoding and decoding process enables the autoencoder to engage in dimensionality reduction, for example, by learning how to ignore noise associated with data collected by behavior collectors 242. Dimension reduction refers to a process of converting a set of input data having vast dimensions (e.g., data with too many variables that are not all important or significant) into data with lesser dimensions ensuring that it conveys similar information concisely.

One-class SVM is a technique that trains a dataset with a set of training data and then uses the trained dataset to determine how different new data is from the training data. For example, a one-class SVM implemented in the aspects described herein is able to train a dataset using data generated by a behavior collector 242 during an observation period for a VM 120. The one-class SVM then uses the trained dataset, which is a representational model of VM 120's expected behaviors, to determine how different data generated by the behavior collector 242 during a monitoring period is from the dataset. The differences found by the one-class SVM algorithm may indicate unexpected behaviors of the VM 120 during the monitoring period. Although certain aspects herein are described with respect to using an unsupervised machine learning technique, and in particular one-class SVM, it should be noted that other appropriate machine learning techniques (e.g., supervised or unsupervised) may be used in certain other aspects.

In certain aspects, the AVM runs in a security appliance, which may be a virtual appliance, such as a VM 120 running on top of hypervisor 116. An example of a security appliance is shown as VM $120_H$ that is configured with AVM 246. In certain aspects, the AVM may instead be executed by a VM or a host at remote data center 104. An example of this is shown in FIG. 2 as AVM 248, running within remote data center 104. In yet other aspects, the event-triggered behavior analysis mechanism may be configured to utilize both AVM 246 and AVM 248. In such aspects, AVM 246 may receive data generated by behavior collectors 242, perform data pre-processing, and then encode the data. AVM 246 may then transmit the encoded data to AVM 248 for decoding and behavioral analysis, which includes the use of the one-class SVM technique, during both the observation and monitoring periods.

Figure 3:
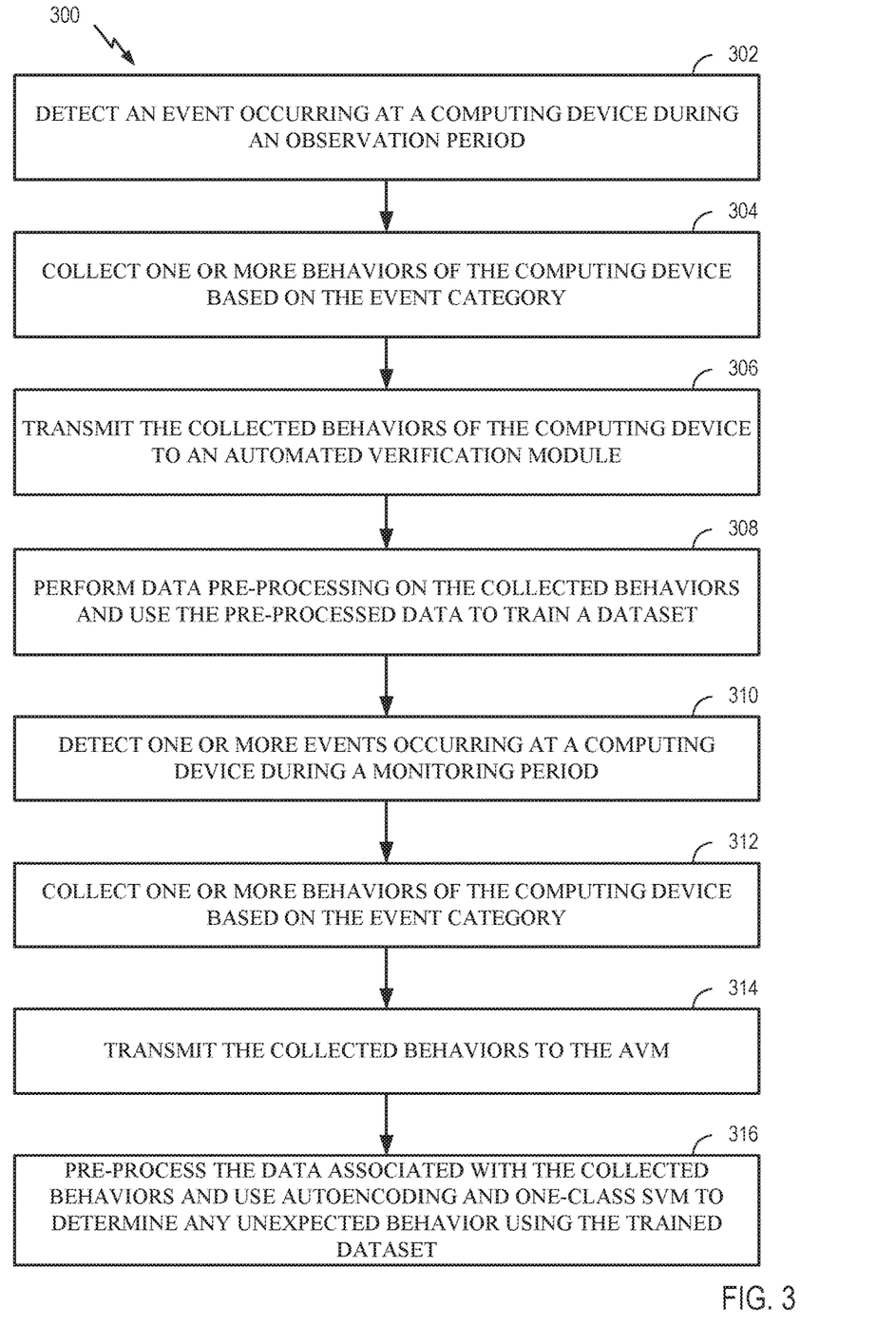
FIG. 3 is a flow diagram depicting a method of performing behavior analysis for a virtual machine executing on the host of FIG. 2, in accordance with certain aspects on the disclosure.

FIG. 3 illustrates example operations 300 carried out to identify unexpected behavior associated with a VM 120. Operations 300 are described below with reference to FIGS. 1 and 2.

At block 302, an event monitor detects an event occurring at a computing device during an observation period. For example, event monitor 240*a* of VM $120_1$ may be configured to detect an event when VM $120_1$ starts receiving packets from a certain IP address. As described above, events are configurable such that event monitor 240*a* may be configured to always detect an event when packets are received from that certain IP address. Once event monitor 240*a* detects and records the event, event monitor 240*a* is configured to perform a preliminary analysis to categorize the event. For example, event monitor 240*a* categorizes the event described above as a networking-related event. In certain aspects, event monitor 240 stores this information in local storage resources associated with VM $120_1$.

At block 304, a behavior collector collects one or more behaviors of the computing device based on the event category. For example, behavior collector 242*a* collects additional data associated with the operations of VM $120_1$ based on the event's category, which indicates that the event is a network-related event. In such an example, behavior collector 242*a*, for example, collects information relating to one or more of VM $120_1$'s incoming and outgoing connections, such as the IP addresses that VM $120_1$ sends and receives information to and from, the port number VM $120_1$ listens on, the status of the connections, and the network protocols associated with the connections. The behaviors of VM $120_1$ at this stage represent VM $120_1$'s expected behaviors.

In certain aspects, information gathered by event monitor 240*a* (e.g., the recorded event and its category) is shared with behavior collector 242 using inter-process communications. In some other aspects, the information is transmitted by event monitor 240*a* to AVM 246 or 248, in which case, the AVM transmits a request to behavior collector 242*a* to collect network-related behaviors of VM $120_1$ based on the event and its category.

At block 306, the behavior collector transmits the collected behaviors of the computing device to an AVM. For example, behavior collector 242*a* transmits the network-related behaviors collected at block 304 to AVM 246. In certain aspects, behavior collector 242*a* may also transmit information associated with the recorded event as well. In certain aspects, behavior collector 242*a* may store this information in local storage resources associated with VM $120_1$.

At block 308, the AVM performs data pre-processing on the collected behaviors and uses the pre-processed data to train a dataset. For example, AVM 246 pre-processes the data associated with the collected behaviors and then uses the pre-processed data to train a dataset by utilizing autoencoders and one-class SVM in an unsupervised manner. In certain aspects, AVM 246 may store this information in local storage resources associated with VM $120_1$.

Blocks 302-308 may be periodically repeated throughout a defined observation period. For example, during a two-week observation period, event monitor 240*a* may detect the same event thousands of times, resulting in behavior collector 242a collecting VM 120₁'s behaviors each time the event is detected by event monitor 240a and sharing the collected behaviors with AVM 246, which continuously trains the dataset. After, for example, thousands of times of blocks 302-308 being performed, the dataset may be trained to a point where the dataset may accurately reflect the expected behaviors of VM $120_1$ when the event described above occurs.

Once the observation period is over, the event-triggered behavior analysis mechanism starts monitoring VM $120_1$ during a monitoring period to ensure that VM $120_1$ operates as expected by using the dataset trained during the observation period.

Note that although the example above was described in relation to a single network-related event, during the observation period the dataset may continuously be trained with a large number of events, each having one or more categories. Also, note that although in the example above AVM 246 is used for training the dataset and performing behavioral analysis associated with VM $120_1$, in another example, behavior collector 242a may continuously transmit the collected behaviors to AVM 248 instead. In yet another example, behavior collector 242a may transmit VM $120_1$'s collected behaviors to AVM 246, which may perform data-preprocessing on the behaviors and encode the data. AVM 246 may then transmit the pre-processed and encoded data to AVM 248 for decoding and training the dataset. In aspects where AVM 248 is used, AVM 248 may store any information associated with the mechanism (e.g., the dataset) in manager database 275.

At block 310, the event monitor detects the event occurring at the computing device during a monitoring period. For example, event monitor 240a detects the same event described in the example above occurring at VM $120_1$. In such an example, event monitor 240a then proceeds to determine the event's category, which indicates that the event is network-related.

At block 312, the behavior collector collects one or more behaviors of the computing device based on the event's category. For example, behavior collector 242a collects network-related behaviors of VM $120_1$, similar to block 304.

At block 314, the behavior collector transmits the collected behaviors to the AVM. For example, behavior collector 242a transmits the collected behaviors to AVM 246. Note that in aspects where AVM 248 is used instead of AVM 246, behavior collector 242a transmits the collected behaviors to AVM 248. In other aspects where both AVM 246 and AVM 248 are used, behavior collector 242a transmits the collected behaviors to AVM 246, which then pre-processes, encodes, and transmits them to AVM 248.

At block 316, the AVM pre-processes the data associated with the collected behaviors and uses autoencoding and one-class SVM to determine any unexpected behavior using the dataset trained at blocks 302-308. More specifically, the trained dataset is a representational model of VM $120_1$'s expected behaviors when the network-related event occurs. As such, if certain data points within the data received from behavior collector 242a during the monitoring period is very different (e.g., different by a threshold) from the data points in the representational model of VM $120_1$'s expected behaviors, AVM 246 is configured to designate such data points as being "out-of-class" and, therefore, associated with unexpected behavior. Upon identifying any unexpected behavior, AVM 246 may be configured to take one or more actions, including issuing an alert, pausing the operation of VM $120_1$, etc.

Similar to blocks 302-308, blocks 310-316 continue to be performed, for example, as long as VM $120_1$ operates in order to identify any unexpected behaviors occurring at the VM, such as software failures, malicious behaviors and security threats, etc. In certain embodiments, because VM $120_1$ is expected to operate as expected most of the time, the data collected while repeating blocks 310-316 can be used to further train the dataset to represent VM $120_1$'s expected behaviors even more accurately and, accordingly, identify VM $120_1$'s with more accuracy. Also, although operations 300 were described as being performed during two different periods, including the observation period and the monitoring period, in certain aspects, no such periods may be defined. More specifically, in such aspects, event monitor 240a, behavior collector 242a, and an AVM (e.g., AVM 246) (also referred to as the components) are configured to start their operations at some point after VM $120_1$ becomes operational. The components may then continue to perform their operations to train and generate a dataset that is a representational model of VM $120_1$'s expected behaviors. This is possible because VM $120_1$ is expected to behave as expected most of the time. As such, most of the data points received by the AVM would represent expected behaviors of VM $120_1$, which, after a certain amount of time, results in the AVM training a dataset that accurately represents a model of VM $120_1$'s expected behaviors. In such an example, once the dataset is trained in that manner, the AVM is able to identify unexpected behavior as described above.

In certain aspects, once the event-triggered behavior analysis mechanism described herein determines that a computing device is behaving unexpectedly, the mechanism may cause one or more remedial actions to be taken with respect to the operations of the computing device. For example, the AVM may cause an alert to be generated (e.g., causing a notification to generate on the display of a VM 120, or another device (e.g. an administrator device (not shown)), where the notification may include information regarding the unexpected behavior).

In other aspects, a remedial action may also include shutting down a process (e.g., a process associated with one or more unexpected behaviors), turning off components associated with an underlying host, turning off one or more VMs 120 and/or other devices, blocking all incoming or outgoing traffic from the VM 120, take a snapshot of the VM 120, blocking similar behaviors, etc. In certain aspects, a remedial action may include requesting response from the VM 120 (e.g., generating an icon or activating a portion of user display of a VM 120) before allowing a process to continue. In such aspects, the AVM will allow a process to continue after it receives a response from a VM 120 and/or an administrator (e.g., an icon was selected or a permission was granted). In certain aspects, the AVM communicates periodically, or in real time, status information (e.g., presence or absence of a security threat) to a VM 120. In other aspects, the AVM will display an icon (e.g., a text, a symbol, a color, and/or etc.) on a VM 120 associated with status information. In yet other aspects, the AVM may indicate status information about the VM 120 to one or more other devices. In some aspects, a remediation broker (not shown) is connected to the AVM and is used to take one or more of the remedial actions described above on behalf of the AVM.

Note that although the aspects above were described with reference to VMs, the event-triggered behavior analysis mechanism may be similarly utilized to identify unexpected behaviors associated with other types of virtual computing instances as well as physical computing devices. In aspects where the mechanism is used for physical computing devices, the event monitor and behavior collector may execute in the user space of the operating system of each of the physical computing devices while the AVM may be executed by a separate physical computing device in the same or different data center.

Also, although in the aspects described herein the event-triggered behavior analysis mechanism is utilized for identifying unexpected behaviors of VMs 120 in data center 102, in certain aspects, the mechanism may be used for identifying unexpected behaviors of VMs or hosts that operate in a cloud computing environment provided by remote data center 104 to the enterprise associated with data center 102. In such aspects, the VMs and/or hosts in the cloud computing environments are similarly configured to execute event monitors and behavior collectors. In addition, an AVM, similar to AVM 248 or AVM 246, may be configured to run in the cloud computing environment.

Accordingly, the aspects described herein provide a technical solution for solving a technical problem with respect to identifying unexpected behaviors associated with the operations of a computing device. More specifically, the technical solution described herein is event-based such that behavior monitoring and collection is triggered by highly configurable (e.g., user configurable) events. Using the event-triggered behavior analysis mechanism described herein, therefore, reduces the amount of information and overhead associated with performing behavior analysis, which means a lower amount of compute, storage, and network resources may be utilized. In addition, event-triggered behavior analysis mechanism described herein reduces any delays associated with behavior analysis and allows for detecting and reporting issues in real-time because with a event-triggered behavior analysis, a lower amount of information may be analyzed, transmitted over the network. Further, the event-triggered behavior analysis mechanism described herein allows for identifying a larger number of issues with more accuracy because the mechanism is configured to be focused on monitoring and collecting behaviors around events that trigger such issues.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of performing behavior analysis for a computing device by a computing system, comprising:
    detecting an event occurring at the computing device at a first time;
    determining, based on the detecting, an event category of the event, wherein the event category is associated with one or more types of behaviors, and wherein a different event category is associated with one or more different types of behaviors;
    collecting first one or more behaviors of the one or more types of behaviors associated with the determined event category occurring on the computing device;
    comparing the first one or more behaviors with a dataset indicating one or more expected behaviors of the computing device associated with the event, wherein the dataset was trained based on one or more past behaviors of the one or more types of behaviors collected from the computing device in association with one or more past events corresponding to the event category;
    upon determining that at least one of the first one or more behaviors corresponds to an unexpected behavior based on the comparing, taking one or more remedial actions.

2. The method of claim 1, further comprising:
detecting the event occurring at the computing device at a second time, wherein the first time is later than the second time;
determining the event category of the event;
collecting second one or more behaviors associated with the determined event category occurring on the computing device; and
training the dataset using the second one or more behaviors.

3. The method of claim 1, wherein the event is user configurable.

4. The method of claim 1, wherein:
collecting the first one or more behaviors is performed using a behavior collector process executing in an operating system of the computing device, and
detecting the event and determining the event category are performed using an event monitor process executing in an operating system of the computing device.

5. The method of claim 1, wherein comparing the first one or more behaviors with the dataset comprises comparing the first one or more behaviors with the dataset using a one-class support vector machine (SVM) algorithm.

6. The method of claim 1, wherein taking the one or more remedial actions comprises causing a remediation broker to take the one or more remedial actions.

7. The method of claim 6, wherein the one or more remedial actions comprise causing a notification to be generated on a display associated with the computing device.

8. The method of claim 6, wherein the one or more remedial actions comprise shutting down a process associated with the unexpected behavior.

9. The method of claim 1, wherein the event category includes at least one of a process-related category, a network-related category, a memory-related category, a signal-related category, or a file-related category.

10. The method of claim 1, wherein the first one or more behaviors include at least one of a process-related behavior, a network-related behavior, a memory-related behavior, a signal-related behavior, a usage-related behavior, a security-related behavior, or a file-related behavior.

11. An apparatus, comprising:
a non-transitory memory comprising instructions; and
a processor in data communication with the non-transitory memory and configured to execute the instructions to cause the apparatus to:
detect an event occurring at a computing device at a first time;
determine, based on the detecting, an event category of the event, wherein the event category is associated with one or more types of behaviors, and wherein a different event category is associated with one or more different types of behaviors;
collect first one or more behaviors of the one or more types of behaviors associated with the determined event category occurring on the computing device;
compare the first one or more behaviors with a dataset indicating one or more expected behaviors of the computing device associated with the event, wherein the dataset was trained based on one or more past behaviors of the one or more types of behaviors collected from the computing device in association with one or more past events corresponding to the event category;
upon determining that at least one of the first one or more behaviors corresponds to an unexpected behavior based on the comparing, taking one or more remedial actions.

12. The apparatus of claim 11, wherein the processor is configured to execute the instructions to further cause the apparatus to:
detect the event occurring at the computing device at a second time, wherein the first time is later than the second time;
determine the event category of the event;
collect second one or more behaviors associated with determined event category occurring on the computing device; and
train the dataset using the second one or more behaviors.

13. The apparatus of claim 11, wherein the event is user configurable.

14. The apparatus of claim 11, wherein:
the processor is configured to execute the instructions to cause the apparatus to collect the first one or more behaviors through a behavior collector process executing in an operating system of the computing device, and
the processor is configured to execute the instructions to cause the apparatus to detect the event and determine the event category through an event monitor process executing in an operating system of the computing device.

15. The apparatus of claim 11, wherein the processor being configured to cause the apparatus to compare the first one or more behaviors with the dataset further comprises the processor being configured to execute the instructions to cause the apparatus to compare the first one or more behaviors with the dataset using a one-class support vector machine (SVM) algorithm.

16. The apparatus of claim 11, wherein the processor being configured to execute the instructions to take the one or more remedial actions further comprises the processor being configured to execute the instructions to cause a remediation broker to take the one or more remedial actions.

17. The apparatus of claim 16, wherein the one or more remedial actions comprise causing a notification to be generated on a display associated with the computing device.

18. The apparatus of claim 16, wherein the one or more remedial actions comprise shutting down a process associated with the unexpected behavior.

19. A non-transitory computer readable medium having instructions stored thereon that, when executed by a computing system, cause the computing system to perform operations comprising:
detecting an event occurring at a computing device at a first time;
determining, based on the detecting, an event category of the event, wherein the event category is associated with one or more types of behaviors, and wherein a different event category is associated with one or more different types of behaviors;
collecting first one or more behaviors of the one or more types of behaviors associated with the determined event category occurring on the computing device;
comparing the first one or more behaviors with a dataset indicating one or more expected behaviors of the computing device associated with the event, wherein the dataset was trained based on one or more past behaviors of the one or more types of behaviors collected from the computing device in association with one or more past events corresponding to the event category;

upon determining that at least one of the first one or more behaviors corresponds to an unexpected behavior based on the comparing, taking one or more remedial actions.

20. The non-transitory computer readable medium of claim 19, wherein the operations further comprise:
   detecting the event occurring at the computing device at a second time, wherein the first time is later than the second time;
   determining the event category of the event;
   collecting second one or more behaviors associated with the determined event category occurring on the computing device; and
   training the dataset using the second one or more behaviors.

* * * * *